UNITED STATES PATENT OFFICE.

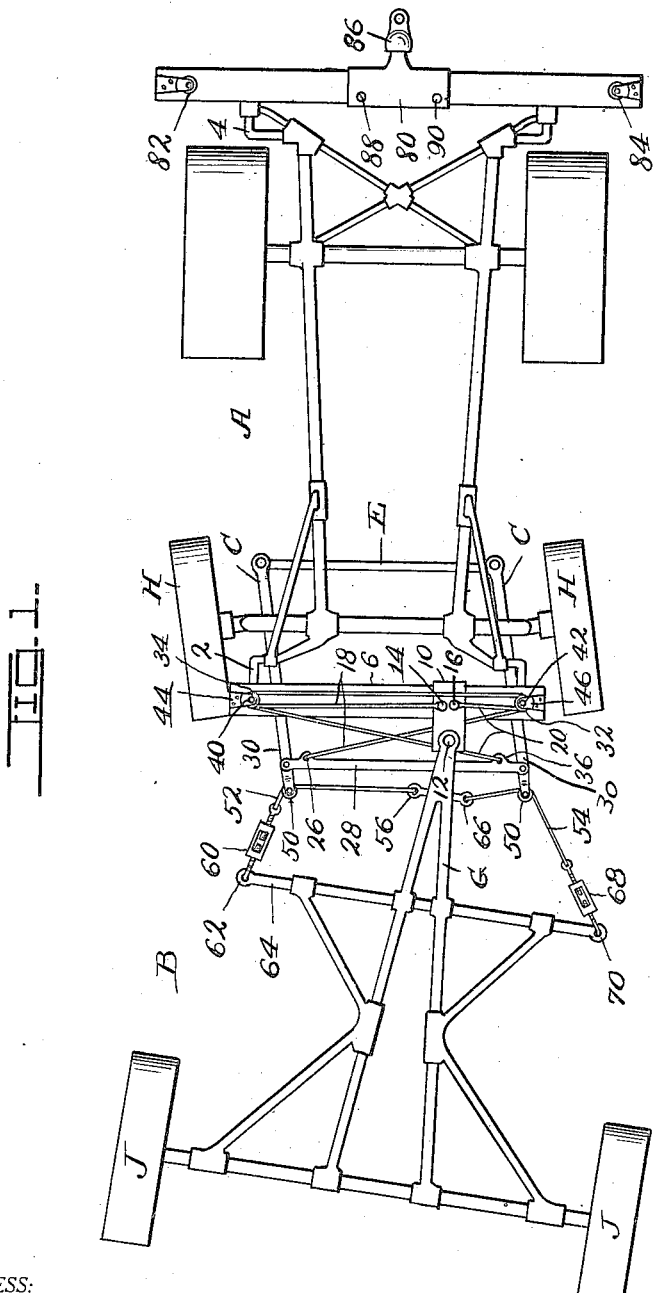

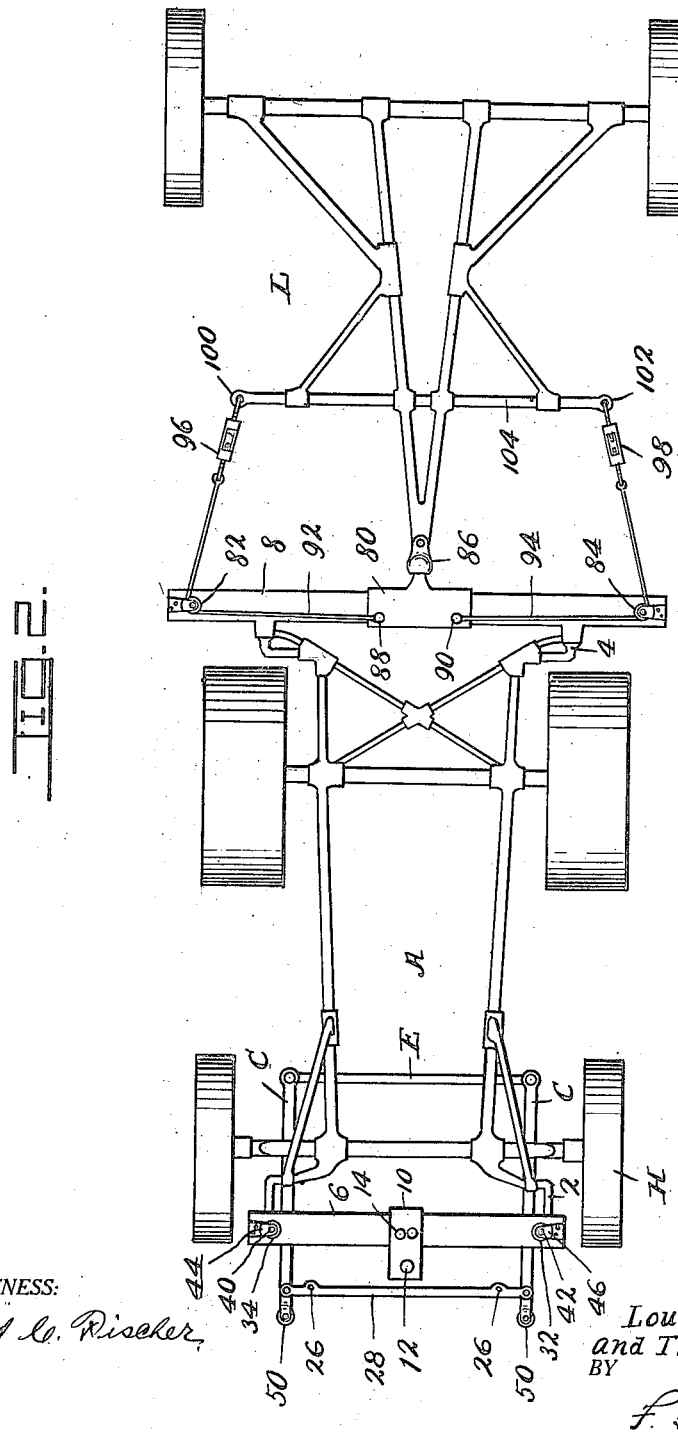

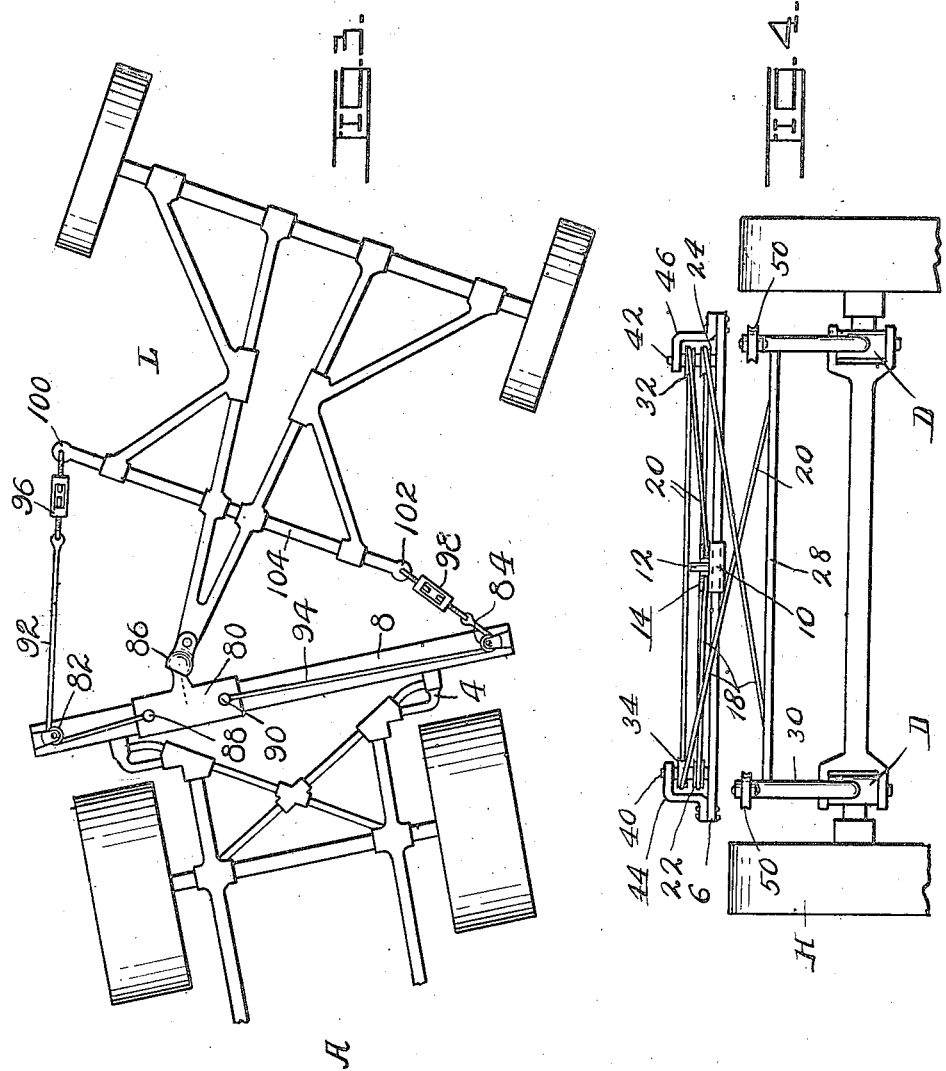

LOUIS A. DELLETT AND THOMAS E. GOUGH, OF RUSH CENTER, KANSAS.

TRACTOR STEERING-HITCH.

1,372,677.                     Specification of Letters Patent.           Patented Mar. 29, 1921.

Application filed August 19, 1919. Serial No. 318,505.

*To all whom it may concern:*

Be it known that we, LOUIS A. DELLETT and THOMAS E. GOUGH, citizens of the United States, residing at Rush Center, in the county of Rush and State of Kansas, have invented certain new and useful Improvements in Tractor Steering-Hitches, of which the following is a specification.

Our invention relates to steering hitches and our object is to produce simple and efficient means whereby farming implements being pushed or pulled by a tractor are caused to turn shorter at the corners of a field than heretofore, and thus leave less ground unplowed or otherwise unworked.

The hitch can also be used to advantage on the road as it will cause a vehicle to follow in the tracks of the tractor in passing around curves instead of tending to leave the road by cutting the corners as is customary where the ordinary hitch is employed.

Other advantages will hereinafter appear, and in order that the invention may be fully understood, reference will now be had to the accompanying drawings, in which:

Figure 1 is a diagrammatic view of a tractor and a grain header connected together by our forward hitch.

Fig. 2 is a diagram of the tractor and a farming implement such as a plow connected together by the rear hitch.

Fig. 3 is a broken plan view of the parts disclosed on Fig. 2, showing how the short turn is accomplished.

Fig. 4 is a fragmentary front elevation of the front steering hitch.

Referring now more particularly to Fig. 1, A designates a tractor and B a farming implement, such for instance as a grain header. The tractor A is provided with the usual steering arms C and knuckles D, the rear ends of the steering arms being connected by a drag bar E.

The frame of the tractor is provided with front and rear extensions 2 and 4 carrying fixedly-mounted transverse slide bars 6 and 8, respectively. The slide bar 6 is provided with a slidable sleeve 10, to the forward end of which the farming implement B is coupled by suitable means such as a pivot 12.

The sleeve 10 is provided with a pair of oppositely-disposed pins 14 and 16, to which the upper rear ends of cables 18 and 20, respectively, are attached. The cable 18 extends around sheaves 22 and 24 and is attached at its forward end to an eye 26 at one end of a connecting bar 28, pivoted at its ends to the forward portions of a pair of arms 30 extending forwardly and upwardly from the steering knuckles D.

The cable 20 runs from the pin 16 around sheaves 32 and 34 and is connected at its forward end to an eye 36 on the connecting bar 28 at the opposite end from that containing the eye 26. The sheaves 22 and 34 are mounted upon a pin 40, and the sheaves 32 and 24 are mounted upon a pin 42. The pins 40 and 42 are mounted on the slide bar 6 and in brackets 44 and 46, fixed to the ends of said slide bar 6.

The forward ends of the arms 30 are provided with sheaves 50 around which cables 52 and 54 travel. The cable 52 is connected at one end to an eye 56 adjacent to the rear end of the implement beam G and at its opposite end to a turn-buckle 60, secured at one end to an eye 62 at one end of a transverse bar 64 fixed to the frame of the implement B. The cable 54 is attached at one end to an eye 66 at the rear portion of the beam G and at its opposite end to a turn-buckle 68 secured to an eye 70 on the opposite end of the bar 64 from that containing the eye 62.

With the parts connected and arranged as shown and described, the operation briefly stated is as follows: In order to cause the farming implement B to make a short turn to the right, the front steering wheels H of the tractor are turned to the left. This movement of the wheels H turns the arms 30 to the left and causes them through the intermediacy of the cable 20 to slide the sleeve 10 to the left on the slide bar 6. As the sleeve 10 slides to the left it carries the rear end of the beam G therewith and causes the wheels J of the implement B to turn to the right. After the implement B has turned the corner, the tractor wheels H are adjusted to cause the sleeve 10 to be drawn to the center of the bar 6 by the cable 18, so that the implement B will travel forwardly in a straight line with the tractor. Any slack occurring in the cables 52 and 54 is readily taken up with the turn-buckles 60 and 68, respectively, and if desired the cables 18 and 20 may be similarly equipped for the same purpose.

Grain headers used in connection with the tractor as above-described may be shortened the length of the space usually occupied by a team employed in pushing the header. Thus a desirable advantage is gained as it is obvious that the shorter the implement the more sharply it may turn corners in a field, so that land heretofore unworked may be utilized for growing crops.

Referring now more particularly to the rear hitch, it will be noted that the slide bar 8 is equipped with a slidable sleeve 80 and sheaves 82 and 84. The sleeve 80 is provided with a universal coupling 86 to which a plow or other farming implement L is connected. The sleeve 80 is also provided with pins 88 and 90 to which the forward ends of cables 92 and 94 are attached. Said cables 92 and 94 run around the sheaves 82 and 84, at opposite ends of the bar 8, and are connected to turn-buckles 96 and 98 which are connected at their rear ends to eyes 100 and 102 at the ends of a transverse bar 104, fixed to the frame of the implement L.

With the parts disposed as shown it is apparent that when the tractor A is steered to the left to turn a corner, the tendency of the farming implement to move straight ahead causes the bar 104 to pull on the cable 92 and slide the sleeve 80 to the right, which causes the implement L to follow the tracks of the rear wheels of the tractor A, instead of cutting the corner in the customary way. After the tractor has turned the corner and is straightened out the bar 104 pulls on the cable 94 and draws the sleeve 80 to the center of the bar 8. If the tractor turns a corner to the right, tension is exerted on the cable 94 to pull the sleeve 80 to the left and thus cause the implement L to follow the tracks of the tractor.

While we have shown the cables 92 and 94 running around the sheaves 82 and 84 and directly to the eyes 100 and 102, respectively, it is obvious that said cables and sheaves may be arranged on the plan of a block and tackle, as in the case of the cables 18 and 20 and the sheaves 34, 22, 32 and 24, to increase the leverage for turning the implement.

From the foregoing description it is apparent that we have produced a steering hitch possessing the advantages above pointed out, and while we have shown and described the preferred form of our invention, we reserve the right to make such changes in the construction, combination and arrangement of parts as properly fall within the spirit and scope of the claims.

Having thus described our invention, what we claim and desire to secure by Letters Patent, is:

1. In combination with a self-propelled vehicle, a slide bar fixed to said vehicle, a member slidably-mounted on said bar, means for coupling said member to a vehicle to be propelled by the self-propelled vehicle, a pair of arms projecting forwardly from the steering gear of the self-propelled vehicle, and cables attached to said arms and the slidable member to slide the latter to the right and the left for the purpose described 2. In combination with a self-propelled vehicle and a second vehicle to be propelled by the first-mentioned vehicle, a slide bar fixed to the first vehicle, a member slidably-mounted on said bar, a coupling on said member to hitch on the second vehicle, a pair of arms projecting forwardly from the steering gear of the first vehicle, sheaves mounted on the slide-bar, cables running around said sheaves and attached to the slidable member and the pair of arms, a transverse bar on the second vehicle, and cables attached to said transverse bar and the rear portion of the second vehicle and having a running engagement with the pair of forwardly projecting arms.

In testimony whereof we affix our signatures, in the presence of two witnesses.

LOUIS A. DELLETT.
THOMAS E. GOUGH.

Witnesses:
 BRUCE A. RUSSELL,
 RAY MARTIN.